United States Patent [19]
Fujimura et al.

[11] Patent Number: 4,788,603
[45] Date of Patent: Nov. 29, 1988

[54] CAMERA FOR SEQUENTIALLY PHOTOGRAPHING A SUBJECT USING A REFERENCE OPTICAL SYSTEM AND A TELESCOPIC OPTICAL SYSTEM

[75] Inventors: Ikuo Fujimura; Mikio Utsugi; Kimiaki Nakada, all of Tokyo, Japan

[73] Assignee: Fuji Photo Film Co., Ltd., Minami-ashigara, Japan

[21] Appl. No.: 919,090

[22] Filed: Oct. 15, 1986

[30] Foreign Application Priority Data

Oct. 19, 1985 [JP] Japan .............................. 60-160035[U]
Dec. 11, 1985 [JP] Japan .............................. 60-190871[U]

[51] Int. Cl.<sup>4</sup> ............................................. H04N 5/781
[52] U.S. Cl. ..................................... 358/342; 358/335; 358/906; 358/909; 360/35.1; 354/412
[58] Field of Search ............... 358/342, 906, 310, 335, 358/909; 354/174, 175, 202, 286, 354, 410, 412; 360/35.1, 33.1

[56] References Cited

U.S. PATENT DOCUMENTS

| | | | |
|---|---|---|---|
| 4,057,830 | 11/1977 | Adcock | 358/906 X |
| 4,131,919 | 12/1978 | Lloyd et al. | 358/906 X |
| 4,447,837 | 5/1984 | Hirata et al. | 358/906 X |
| 4,541,010 | 9/1985 | Alston | 358/906 X |
| 4,541,016 | 9/1985 | Ochi et al. | 358/906 X |
| 4,553,170 | 11/1985 | Aoki et al. | 358/909 X |
| 4,641,215 | 2/1987 | Katoh et al. | 358/310 X |
| 4,658,304 | 4/1987 | Tsunekawa et al. | 360/35.1 X |
| 4,675,747 | 6/1987 | Hanma et al. | 360/35.1 X |
| 4,692,815 | 9/1987 | Kawahara et al. | 360/35.1 X |

*Primary Examiner*—Raymond F. Cardillo
*Assistant Examiner*—W. R. Young
*Attorney, Agent, or Firm*—Parkhurst, Oliff & Berridge

[57] ABSTRACT

The camera according to the present invention includes a reference optical system and a telescopic optical system. After photographing the subject using the reference optical system, a close-up of the subject is photographed using the telescopic optical system. As a consequence, when the subject is reproduced on a television screen, a sharp image can be obtained.

8 Claims, 9 Drawing Sheets

CAMERA FOR SEQUENTIALLY PHOTOGRAPHING A SUBJECT USING A REFERENCE OPTICAL SYSTEM AND A TELESCOPIC OPTICAL SYSTEM

BACKGROUND OF THE INVENTION

1. Field of the Invention

This invention relates a camera having a function of automatically taking a close-up of a person in portrait mode photographing.

2. Description of the Prior Art

Recently, there has been developed an electronic still camera system wherein an image pickup device such as a solid state image sensing device or an image pickup tube is combined with a recording device using a magnetic disc which is inexpensive as a recording medium and yet has a comparative high memory capacity. A subject is still-photographed electronically and recorded into a rotating magnetic disc, and the reproduction of an image is carried out by a television, a printer or the like, which are provided separately.

Now, it has been found the following disadvantage in the electronic still camera of the type described because of the construction thereof. Namely, in the electronic still camera, the degree of integration of the charge coupled device (CCD) for image-sensing a subject is still low even with the current technique of forming the integrated circuits, and the resolution of the image is unsatisfactory. Since reproduction of the sensed image is performed through a television (hereinafter referred briefly to as "TV"), the resolution of the image renders great influences to the number of picture elements and the number of scanning lines of the TV screen. Because of this, in photographing by use of the electronic still camera, it is necessary to pay sufficient consideration to the size of the subject as will be described hereunder.

Figure 5:
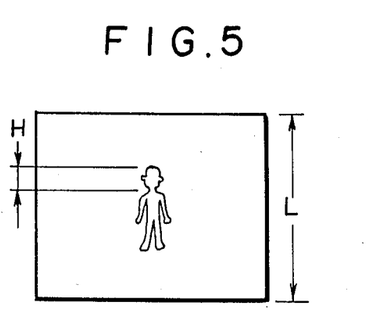
FIG. 5 is an explanatory view showing the photo print.
Figure 6:
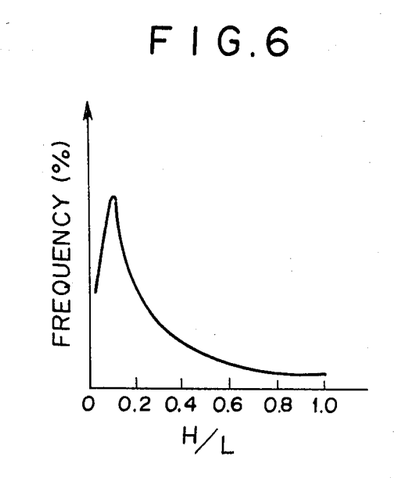
FIG. 6 is an explanatory view showing the rate, at which the face of the subject to be taken as shown in FIG. 5 occupies a space.

In general, when photographing a portrait the rate of a face which occupies a space in the photographic background develops the following tendency. More specifically, FIG. 5 shows a photo print, in which L indicates the longitudinal dimension of the photo print and H the size of a face, respectively. FIG. 6 is a chart, wherein a rate H/L, at which the face occupies a space in a photo print in general is given as an abscissa and a frequency, at which the rates H/L occur, is given as an ordinate. As apparent from the drawing, in general, amateur cameramen tend to photograph a person as a whole. As a result, the highest frequency occurs when the abscissa H/L is about 0.1. However, at the time of photographic printing, a silver salt film of fine grain structure is used as a recording medium, so that an image printed on photographic printing paper is good in resolution and sharply taken, thus presenting no problem.

Figure 7:
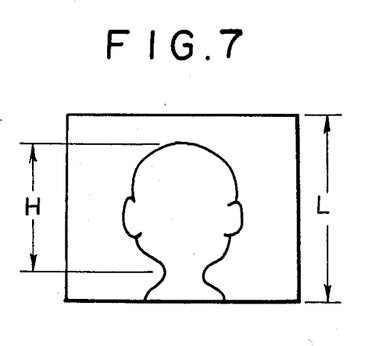
FIG. 7 shows the TV screen.
Figure 8:
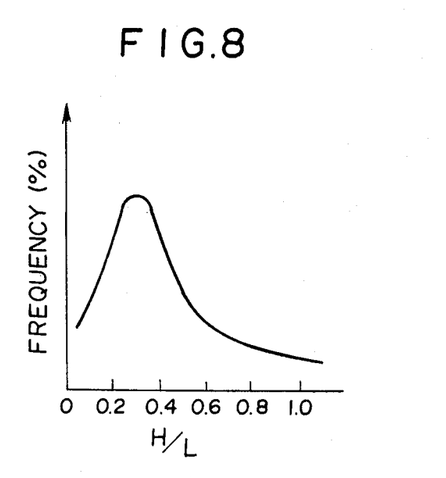
FIG. 8 is an explanatory view showing the rate, at which the face of the subject to be taken as shown in FIG. 7 occupies a space.

In contrast thereto, in a method of reproducing a sensed image on a TV screen, e.g. TV broadcasting, the following contrivance in photographing is made. FIG. 7 shows an ordinary TV screen. In the drawing, L indicates the size of screen in the longitudinal direction, and H the size of a face, respectively. FIG. 8 is a chart, wherein the ratio H/L, at which a face of an image of a person delivered from a TV broadcasting station occupies a space in the TV screen shown in FIG. 7, is given as an abscissa and a frequency, at which the rates H/L occur, is given as an ordinate. The drawing shows that the highest frequency occurs when H/L is about 0.3. As described above, when the subject to be photographed is a person in a TV image of the TV broadcasting station, to improve the resolution of the sensed image and make the sensed image easy in looking at, it is found that the face portion is photographed and broadcasted so as to occupy about 30% of the TV screen.

As shown above, when the subject to be photographed is a person, if photographing is made by use of the electronic still camera with the feeling of photographing by a camera using an ordinary silver salt film, then, when the sensed image is reproduced on the TV screen so as to decrease the size of the photographed face, the resolution is lowered, thus presenting a problem that the face cannot be discriminated.

As a consequence, to photograph a person by use of an electronic still camera, it is desirable to use an electronic still camera having a function of automatically taking a close-up photograph.

Recently, a so-called TV photo system has been utilized, in which the subject photographed by a camera on a negative, a print or the like is recorded and stored in a magnetic disc for an electronic camera, which disc is reproduced by use of a reproducer as necessary, and displayed on a TV screen for enjoying.

Even with this system, since the person is displayed on the TV screen, it is necessary to take a close-up.

Further, with a film having a small number of picture elements, such as a 110 film and a disc film, it is preferable to take a close-up when a person is photographed.

SUMMARY OF THE INVENTION

The present invention has been developed to obviate the above-described disadvantages of the prior art and has as its object the provision of a camera having a function of performing two continuous photographic actions including photography in a reference mode and photography in a telescopic mode for performing portrait photography.

To achieve the above-described object, the present invention contemplates a camera comprising:
 an optical finder section for confirming a photographing scope of a subject to be photographed;
 and means for automatically changing over from a reference optical system to a telescopic taking optical system or vice versa;
 wherein reference photography is performed in operational association with a shutter release, and subsequently, lens change-over is made to perform a telescopic taking automatically and continuously.

BRIEF DESCRIPTION OF THE DRAWINGS

The exact nature of this invention, as well as other objects and advantages, will be readily apparent from consideration of the following specification relating to the accompanying drawings, in which like reference characters designate the same or similar parts throughout the figures thereof and whererin.

DETAILED DESCRIPTION OF THE INVENTION

Detailed description will hereunder be given of the preferred embodiment of the camera according to the present invention with reference to the accompanying drawings.

Figure 1:
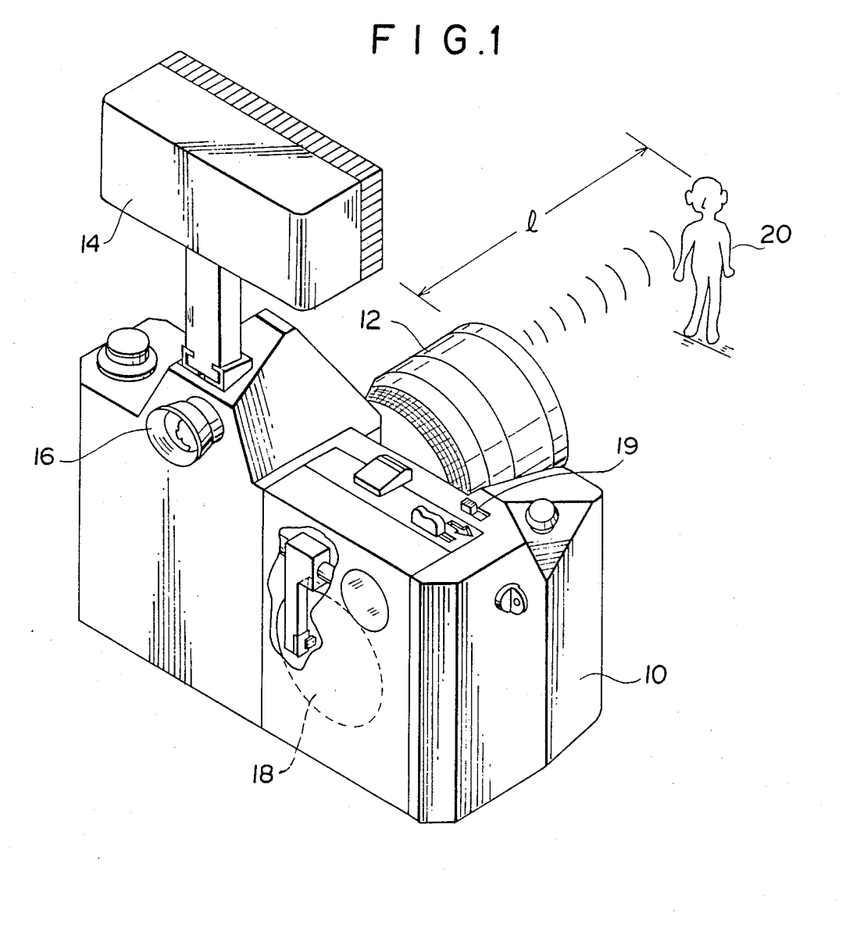
FIG. 1 is a perspective view showing the outer appearance of the electronic still camera embodying the present invention.

FIG. 1 shows the outer appearance and an example of use of the electronic still camera embodying the present invention. In the drawing, designated at 10 is a main body of the electronic still camera, 12 a taking lens, 14 a strobe, 16 an optical finder, 18 a magnetic disc as being a recording medium for an image, and 19 a shutter release button. Furthermore, the electronic still camera is spaced about a distance l apart from a subject 20 to be taken, and the distance to the subject is accurately measured by a well known auto-focus technique, whereby automatic focusing of the image is performed on the basis of the measured result. Additionally, in the electronic still camera, a portrait a close-up mode can be switched to a normal mode or vice versa. The portrait mode will hereunder be described.

The schematic inner construction of the electronic still camera will hereunder be described with reference to FIG. 2.

Figure 2:
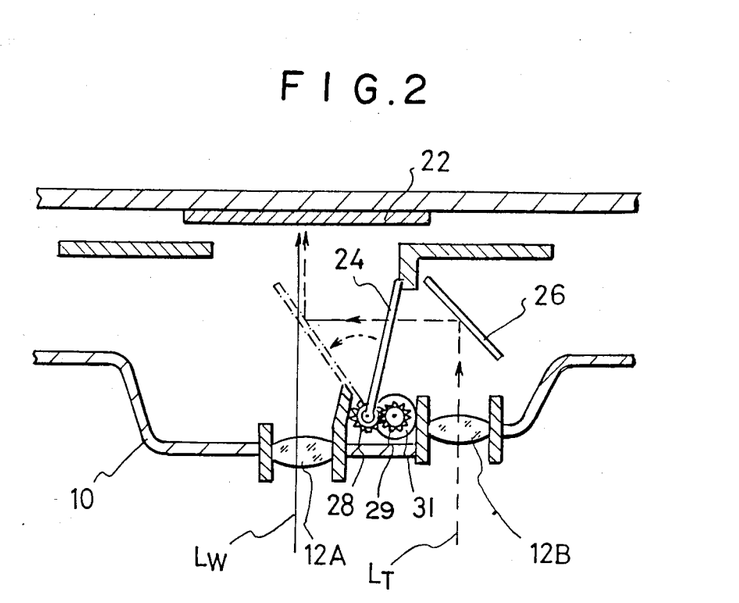
FIG. 2 is a schematic diagram showing the inner construction of the electronic still camera shown in FIG. 1.
Figure 3:
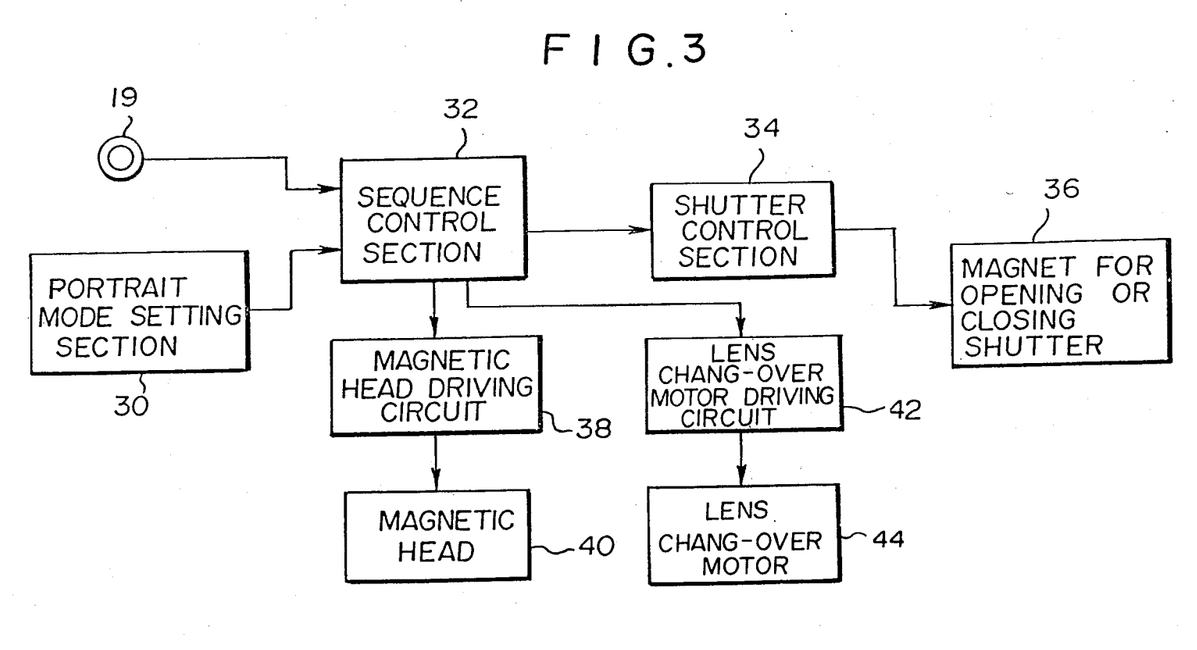
FIG. 3 is a block diagram showing the control section of the electronic still camera shown in FIG. 1.

As shown in FIG. 2, a reference light $L_W$ passes through a reference lens 12A for photographing in a reference mode for normal photography. Furthermore, a lens telescopic 12B is provided on the main body 10 of the camera, and a telescopic light $L_1$ enter through the telescopic lens 12B for photographing in a telescopic mode for portrait or close-up photography. Provided in the rear of the main body 10 of the camera is a CCD 22, onto which the reference light $L_W$ is adapted to fall. More specifically, a movable mirror 24 is located at a position indicated by solid lines shown in FIG. 2, whereby the telescopic light $L_T$ does not reach the CCD 22, so that only the reference light $L_W$ posses to the CCD 22. Provided at the proximal end portion of the mirror 24 is a gear 28, which is in meshing engagement with a gear 29 provided on an output shaft of a lens change-over motor 31. As a consequence, when the motor 31 is driven to bring the mirror 24 to a position indicated by hypothetical or phantom lines in FIG. 2, the reference light $L_W$ is shielded by the mirror 24 and the telescopic light $L_T$ is reflected by a fixed mirror 26 and the mirror 24, and caused to pass onto the CCD 22. FIG. 3 is a block diagram showing a control section for changing over the mirror 24. First, when a portrait mode setting section 30 is changed over to the portrait mode, a portrait mode signal is delivered to a sequence control section 32. Furthermore, when the shutter release button 19 is connected to the sequence control section 32 to operate the shutter release button 19, an appropriate exposure value is determined in a shutter control section 34, whereby a magnet 36 for opening or closing a shutter is operated. On the other hand, a signal is adapted to be delivered from the sequence control section 32 to a magnetic head driving circuit 38. When the portrait mode is set in the portrait mode setting section 30 and a shutter release is made, a magnetic head is automatically fed to a track for reference picture recording, and subsequently, to a track for picture taking and recording. Further, when the shutter release operation is made when the portrait mode is set, after the photographing in the reference mode, the lens change-over motor 31 is driven by a lens change-over motor driving circuit 42, whereby the mirror 24 is changed or pivoted to a position indicated by the hypothetical lines in FIG. 2, so that the reference mode is changed over to the telescopic mode.

Figure 4:
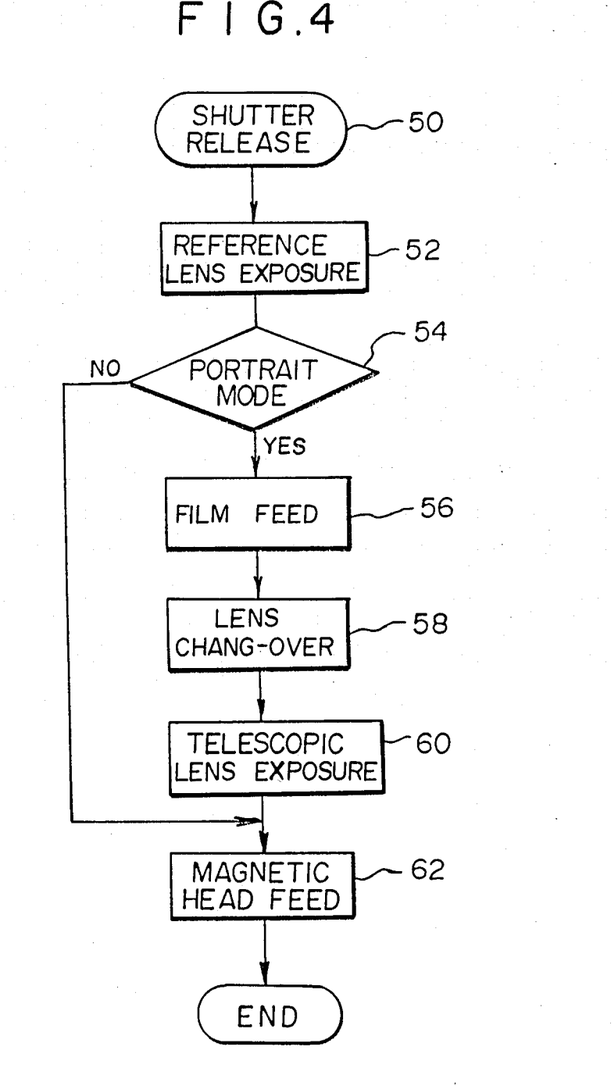
FIG. 4 shows the flow chart of action of the electronic still camera shown in FIG. 1.

Operation of the above-described embodiment of the camera according to the present invention will hereunder be described with reference to the flow chart shown in FIG. 4. First, when the shutter release operation is performed in Step 50 shown in FIG. 4, the exposure is made through reference lens 12A (Step 52), whereby the normal picture taking is made. Subsequently, in Step 54, judgment is made as to whether the mode is the portrait mode or not. When the portrait mode setting section 30 is set to the portrait mode, the magnetic head 40 is fed to the subsequent track of the magnetic disc (the track for the picture taking and recording) (Step 56). Subsequently, the motor 32 is driven to move the mirror 24, whereby the reference lens 12A is changed over to the telescopic lens 12B (Step 58). The exposure is performed by the telescopic lens 12B in this state (Step 60), thus completing the telescopic picture taking. Subsequently, the magnetic head is fed to the subsequent track as shown in Step 62, thus completing the routine.

When it is judged that the mode is not the portrait mode in Step 54 described above, the magnetic head 40 does not perform the telescopic picture taking, but is fed to the subsequent track by Step 62.

According to the embodiment of the present invention as described above, when portrait mode is set, the two continuous picture takings are employed, wherein the telescopic picture taking is automatically performed after the reference picture taking. There may be continuously reproduced an image on the screen, which image is intended to be obtained by ordinary photographers for example, when the image in which the background against a person is large, whereby the situation at the time of photographing is easy to the face of the person is small as compared with the number of picture elements of television, and further, an image, which is obtained by enlarging a portion of the above image (namely, the expression of the person) can be viewed, even with the number of picture elements of the television.

In the above embodiment, change-over between the reference and telescopic modes is performed through a change of light path by the mirror 24. However, the present invention is applicable to another embodiment wherein a conversion lens is inserted in the light path of the reference lens so as to form the telescopic optical system.

In the above embodiment, description has been given to the electronic still camera using the magnetic disc as the recording medium. However, with other ordinary cameras other than the electronic still camera described above, there are some cases where close-ups are needed, whereby the two continuous takings can be applied to the ordinary cameras. In this case, film feed is performed instead of magnetic head feed.

As has been described hereinabove, with the camera according to the present invention, the subject to be taken is subjected to the two continuous picture takings by use of the lenses of the two systems including the reference lens system and the telescopic lens system, so that a reproduced image of the subject telescopically taken has good resolution on the TV screen.

Figure 9:
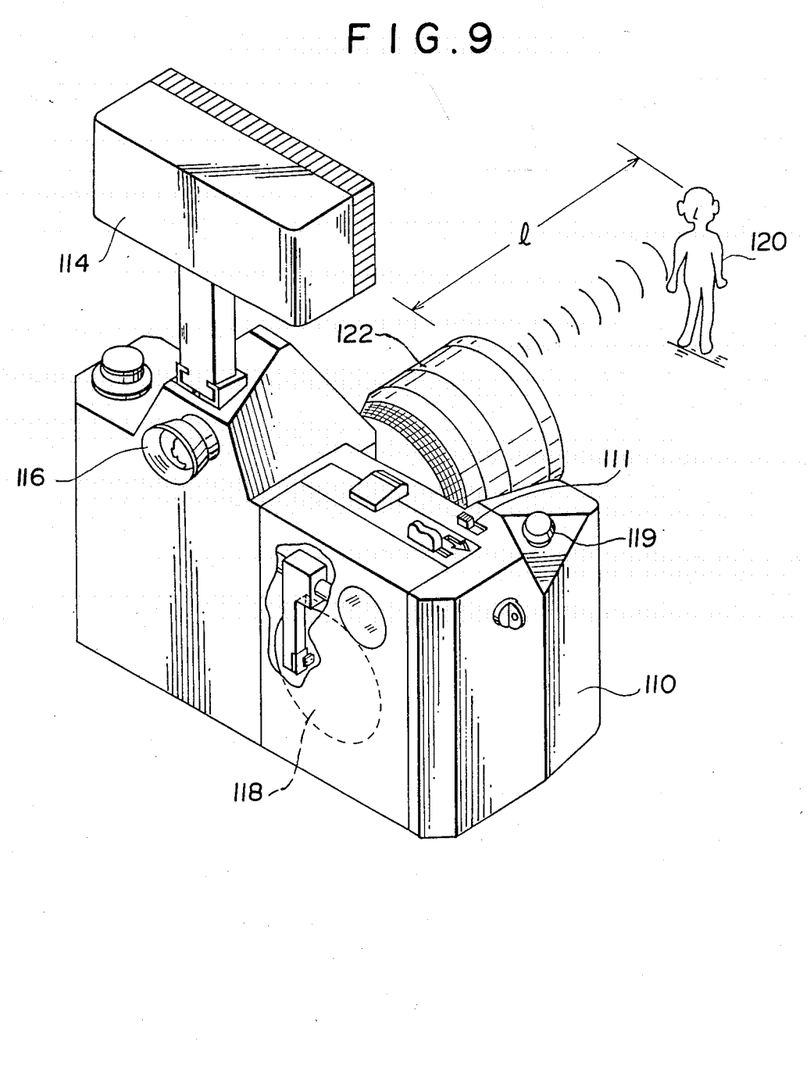
FIG. 9 is a perspective view showing the outer appearance of another embodiment of the electronic still camera according to the present invention.

FIG. 9 shows the outer appearance and use of another embodiment of the electronic still camera, to which is applied the present invention. In the drawing, designated at 110 is a main body of the electronic still camera, 111 a picture taking mode change-over switch, 122 a zoom lens, 114 a strope, 116 an optical finder, 118 a magnetic disc as a recording medium for an image, and 119 a shutter release button, respectively. Furthermore, the electronic still camera is spaced about a distance 1 apart form a subject 120 to be taken, and the distance to the subject is accurately measured by a well known auto-focus technique, whereby automatic focusing of the image is performed on the basis of the measured result. Additionally, in the electronic still camera, the portrait mode can be switched to the normal mode or vice versa.

Figure 10:
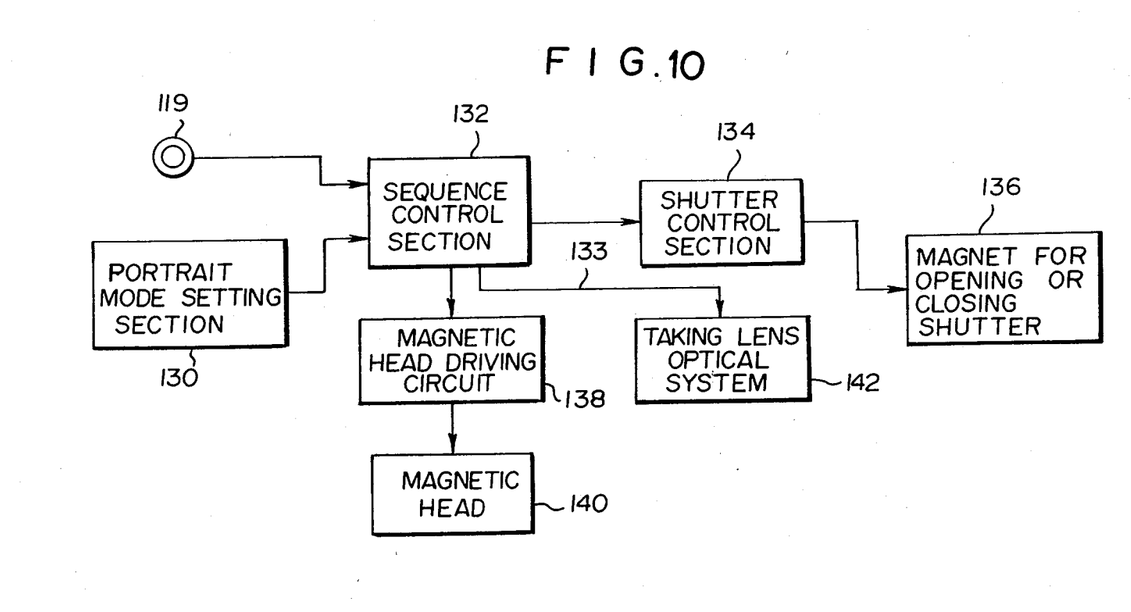
FIG. 10 is a block diagram showing the outline of the electric circuit of the electronic still camera illustrated in FIG. 9.

Operation of the electronic still camera will hereunder be described with reference to the block diagram shown in FIG. 10.

First, when a portrait mode setting section 130 is switched to the portrait mode, a portrait mode signal is delivered to a sequence control section 132. The shutter release button 119 is connected to the sequence control section 132. When the shutter release button 119 is operated, an appropriate exposure value is determined in a shutter control section 134, whereby a magnet 136 for opening or closing a shutter is operated. On other hand, a signal is adapted to be delivered from a sequence control section 132 to a magnetic head driving circuit 138. When the portrait mode is set and a shutter release is made, this magnetic head driving circuit 138 automatically feeds a magnetic head to a track for reference picture taking and recording, and subsequently, to a track for telescopic picture taking and recording. Furthermore, when the shutter release operation is made in the case where the portrait mode is set, immediately after the reference taking, a zoom lens driving signal 133 for forcibly zooming up groups of zoom lenses (See FIG. 11) of an optical system to be described hereunder is outputted from the sequence control section 132 to an optical system 142, whereby the reference mode is switched to the telescopic mode.

Figure 11:
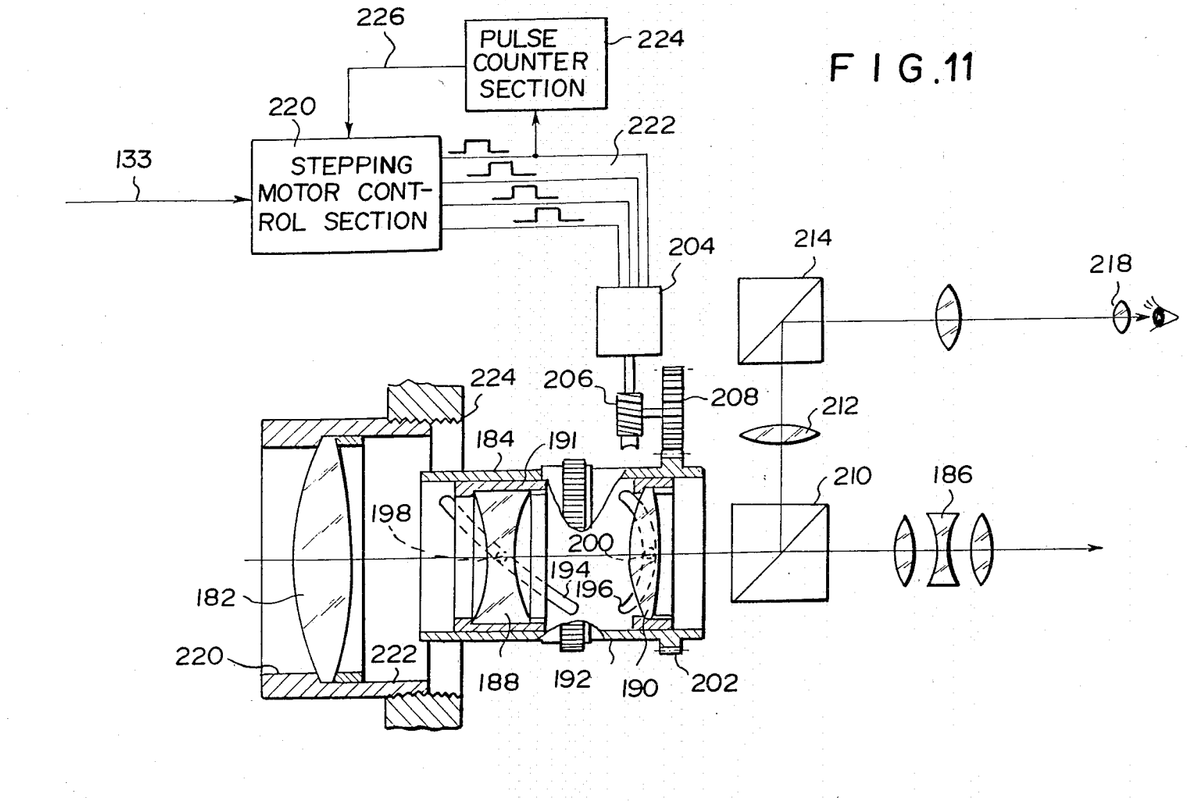
FIG. 11 is an explanatory view showing the arrangement of the taking lens optical system.

The arrangement of the optical system shown in FIG. 11 will hereunder be described. The optical system includes groups of zoom lenses and an automatic focusing mechanism section. The arrangement of the optical system will hereunder be described.

First, the groups of zoom lenses include a front lens 182, a group 184 of adjust lenses and a group 186 of lenses. Of these lenses, the group 184 of adjust lenses is constituted by two lenses 188 and 190, both of which are movable in the direction of optical axis. An outer tube 192 is provided on the inner surface thereof with cam grooves 194 and 196, in which are positioned pins 198 and 200, which are projected from lens holding tubes of the lenses 188 and 190. Rotation of the outer tube 192 changes the magnification, however, an image of the subject to be taken is formed at a predetermined position at all times. Furthermore, to perform focusing of the groups of zoom lenses, the lens 182 is movable in the direction of optical axis, while operationally associated with the group 184 of adjust lenses. Formed on the lens holding tube 220 of the front lens 182 are external threads 222, which are threadably coupled into stationary internal threads 224 of the main body of the camera.

On the other hand, a half mirror type prism 210 is interposed between the group 184 of adjust lenses and the group 186 of lenses. An incident beam reflected by this half mirror type prism 210 is adapted to fall into a finder optical system having a lens 212.

Furthermore, to form an optical axis parallel to the optical axis of the groups of zoom lenses in the finder, a total reflection type prism 214 is provided, whereby the image of the subject to be taken can be inspected through an eye-piece 218.

The incident beam passing through the half mirror type prism 210 reaches a charge coupled device (CCD) to be positioned to the right in FIG. 11, not shown.

Now, zoom driving in the zoom lens device of the type described is performed by an electromotion device such as a motor in general, and one of such examples is a stepping motor 204 as shown. This stepping motor 204 can be operated by delivering an UP pulse signal and a DOWN pulse signal, which are different in phase from each other relative to an exciting coil. In this embodiment, the stepping motor is controlled by a stepping motor control section 220 operable in response to the zoom lens driving signal 133 as shown in FIG. 11. Furthermore, a pulse counter section for detecting a portion of a signal line 222 lead out from the stepping motor control section 220 counts pulse signals and, when the pulse signals thus counted reach a predetermined number, applies an interrupt signal 226 to the stepping motor control section 220 to stop outputs of the pulse signals.

Figure 12:
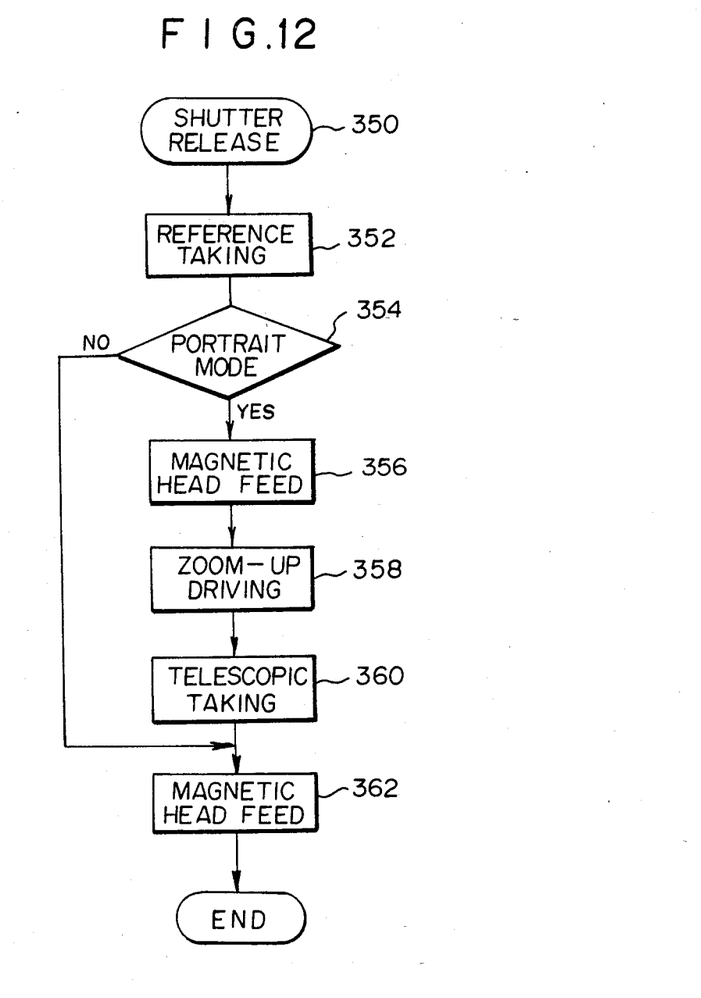
FIG. 12 shows a flow chart of action of the electronic still camera shown in FIG. 1.

Operation of the embodiment of the camera with the above-described arrangement according to the present invention will hereunder be described with reference to the flow chart shown in FIG. 12. First, when the shutter release operation is performed in Step 350 in FIG. 12, the reference picture taking (Step 352) is effected. Subsequently, in Step 354, judgment is made as to whether the portrait mode is set or not. When the portrait mode is set by the portrait mode setting section 130, the magnetic head 140 is fed (Step 356). Next, the stepping motor control section 220 effects zoom-up driving in response to the zoom lens driving signal 133 (Step 358), and, in this state, telescopic picture taking is performed (Step 360). Subsequently, as shown in Step 362, the magnetic head is fed to the subsequent track, thus completing the routine.

When it is judged that the mode is not the portrait mode in Step 354 described above, the magnetic head 140 does not perform telescopic picture taking and is fed to the subsequent track by Step 162.

According to the embodiment of the present invention as described above, when the portrait mode is set, two continuous photographs are taken, wherein the telescopic picture taking is automatically performed immediately after the reference picture taking. There may be continuously reproduced an image on the screen, which is intended to be obtained by ordinary photographers, namely the image, in which the background against a person is large, whereby the situation at the time of photographing is easy to be understood. However, the face of the person is small as compared with the number of picture elements of the television, and further, an image, which is obtained by enlarging a portion of the above image (namely, the expression of the person) can be caught, even with the number of picture elements of the television.

In this embodiment, when the portrait mode is set, the telescopic picture taking is effected immediately after the reference picture taking. However, the present invention need not necessarily be limited to this operation, and, for example, before switching from the reference picture taking to the telescopic picture taking, an intermediate telescopic picture taking which is positioned therebetween may be performed.

In the above embodiment, description has been given to the electronic still camera using the magnetic disc as the recording medium. However, with ordinary cameras other than the electronic still camera described above, there are some cases where close-up takings are needed, whereby the two continuous picture takings of this invention can be applied to the ordinary cameras. In this case, film feed is performed instead of magnetic head feed.

As has been described hereinabove, with the camera according to the present invention, the subject to be taken is subjected to two continuous picture takings including the reference picture taking and the telescopic picture taking by use of the zoom lenses, so that the image of the subject taken telescopically and reproduced on the television screen is high in resolution.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera for photographing a subject, comprising:
  a first photographing optical system for photography in a reference mode;
  a second photographing optical system for photography in a portrait mode wherein an image of said subject is enlarged relative to an image of said reference mode;
  optical system change-over means for selecting said first photographing optical system and said second photographing optical system in response to selection of said reference mode and portrait mode, respectively;
  recording means for recording the image of said subject onto a recording medium from said first and second photographing optical systems; and
  control means actuated in response to selection of said portrait mode for sequentially causing said optical system change-over means to select said first photographing optical system, said recording means to record the image of said subject in the reference mode using said first photographing optical system, said optical system changeover means to change said first photographing optical system to said second photographing optical system, and said recording means to record said enlarged image of said subject using said second photographing optical system.

2. A camera as set forth in claim 1, wherein an image of said subject to be photographed from said first optical system and said second optical system is sensed by a solid state image sensing device, and an electric signal from said solid state image sensing device is recorded into a magnetic disc.

3. A camera as set forth in claim 2, wherein: said optical system change-over means includes a mirror linearly movable to interrupt respective light paths for said first optical system and said second optical system such that the light path through the optical system not being used by the recording means is blocked, and a motor for rotating said mirror;
  said mirror selectively interrupting the light path of said second optical system to permit said first optical system to photograph said subject when said mirror is positioned in the light path of said second optical system, and
  said mirror selectively interrupting the light path of said first optical system to permit said second optical system to photograph said subject when said mirror is positioned in the light path of said first optical system.

4. A camera as set forth in claim 3, wherein said control means delivers an optical system change-over signal to a motor when the portrait mode is selected, whereby said subject is automatically photographed with said second optical system after photographing of said subject with said first optical system.

5. A camera for photographing a subject, comprising:
  an optical system including telescopic zoom lenses for photographing said subject in a reference mode and a portrait mode wherein an image of said subject is enlarged relative to said reference mode;
  mode change-over means for selectively switching between said reference mode and said portrait mode;
  recording means for recording the image of said subject from said optical system into a recording medium; and
  control means actuated in response to selection of said portrait mode for sequentially causing said mode change-over means to select said reference mode, said recording means to record the image of said subject using said optical system in the reference mode, said mode change-over means to change said optical system from said reference mode to said portrait mode, and said recording means to record said enlarged image of said subject using said optical system in said portrait mode.

6. The camera as set forth in claim 5, wherein said image of the subject to be photographed with optical system is sensed by a solid state image sensing device and an electric signal from said solid state image sensing device is recorded an a magnetic disc.

7. The camera as set forth in claim 6, wherein said telescopic zoom lenses in the optical system are driven by a motor.

8. The camera as set forth in claim 7, wherein said control means delivers a driving signal to said motor to drive the telescopic lens upon completion of photography in the reference mode, when the portrait mode is selected by said mode change-over means.

* * * * *